US007308543B2

(12) United States Patent
Kishi

(10) Patent No.: US 7,308,543 B2
(45) Date of Patent: Dec. 11, 2007

(54) METHOD AND SYSTEM FOR SHREDDING DATA WITHIN A DATA STORAGE SUBSYSTEM

(75) Inventor: Gregory T. Kishi, Oro Valley, AZ (US)

(73) Assignee: International Business Machines Corporation, Armonk, NY (US)

( * ) Notice: Subject to any disclaimer, the term of this patent is extended or adjusted under 35 U.S.C. 154(b) by 344 days.

(21) Appl. No.: 11/086,871

(22) Filed: Mar. 22, 2005

(65) Prior Publication Data

US 2006/0218113 A1 Sep. 28, 2006

(51) Int. Cl.
*G06F 12/16* (2006.01)
(52) U.S. Cl. .................. 711/154; 711/135; 711/159; 711/161; 711/162; 711/163
(58) Field of Classification Search ................. 711/154, 711/159, 161, 162, 135
See application file for complete search history.

(56) References Cited

U.S. PATENT DOCUMENTS

| 6,073,221 | A | | 6/2000 | Beal et al. |
| 6,085,298 | A | * | 7/2000 | Ohran ........................ 711/162 |
| 6,247,096 | B1 | | 6/2001 | Fisher et al. |
| 6,493,709 | B1 | | 12/2002 | Aiken |
| 6,567,811 | B1 | | 5/2003 | Edwards et al. |
| 6,973,654 | B1 | * | 12/2005 | Shutt et al. .................. 718/105 |
| 2003/0065656 | A1 | | 4/2003 | De la Torres et al. |
| 2005/0154582 | A1 | * | 7/2005 | Kortenoeven et al. ...... 704/200 |
| 2005/0198450 | A1 | * | 9/2005 | Corrado et al. ............. 711/162 |
| 2006/0010301 | A1 | * | 1/2006 | Yagawa ...................... 711/163 |
| 2006/0031268 | A1 | * | 2/2006 | Shutt et al. .................. 707/202 |
| 2006/0155944 | A1 | * | 7/2006 | Kano .......................... 711/161 |
| 2007/0088923 | A1 | * | 4/2007 | Armstrong-Crews et al. ............... 711/159 |

* cited by examiner

*Primary Examiner*—Jack Lane
(74) *Attorney, Agent, or Firm*—Dillon & Yudell LLP

(57) ABSTRACT

A method and system for shredding data within a data storage subsystem is disclosed. According to one embodiment, a method is provided of continually shredding data within a data storage subsystem in which all the data of a first storage element is made permanently unreadable followed by the performance of a data shred process. In the described data shred process, second storage element is first selected (e.g., from plurality of candidate or potential storage elements), which includes a first storage object to be preserved and a second storage object to be shredded. Once the second storage element is selected, data of the first storage object is stored/copied within the first storage element. Thereafter, all data of the second storage element is rendered permanently unreadable.

14 Claims, 6 Drawing Sheets

METHOD AND SYSTEM FOR SHREDDING DATA WITHIN A DATA STORAGE SUBSYSTEM

CROSS-REFERENCE TO RELATED APPLICATIONS

The present application is related to the following U.S. patent applications, which are assigned to the assignee hereof and incorporated herein by reference in their entireties and for all purposes:

U.S. patent application No. 11/087,027, entitled, "Method and System for Scrubbing Data within a Data Storage Subsystem," filed on even date.

BACKGROUND

1. Technical Field

Embodiments of the present invention relate generally to data storage and management and more particularly to a method and system for shredding data within a data storage subsystem.

2. Description of the Related Art

Recently, enterprises have become more dependent on the ability to store, organize, manage and distribute data. Accordingly, "information lifecycle management," the process of managing business data from conception until disposal in a manner that optimizes storage, access, and cost characteristics has become increasingly important. In particular, the significance of how data is "deleted" or disposed of has increased as confidential data has begun to play a more vital role in business transactions and stricter regulations are imposed on maintaining customer privacy.

FIG. 1 illustrates a high level block diagram of a data storage network including a conventional data storage subsystem in which stored data may be designated for destruction or "shredding." Data storage network 100 of FIG. 1 includes a host 102 communicatively coupled to a data storage subsystem 104. Data storage subsystem 104 of the illustrated embodiment includes storage 106 coupled with a storage management processing module 108 as shown. Storage 106 of the illustrated data storage subsystem 104 includes at least one storage element 112 (e.g., a logical volume) capable of storing data within one or more storage objects (e.g., storage objects 114, 116 and 118) such as a file. Within data storage network 100 of FIG. 1, data is stored within storage elements (e.g., storage element 112A) utilizing storage management processing module 108. In the illustrated embodiment, the manner in which data is stored is monitored utilizing metadata 110 maintained or used by storage management processing module 108.

Storage element 112 of data storage subsystem 104 includes two active data objects (storage objects 114 and 116) and one inactive or "latent" storage object (storage object 118). Active and inactive storage objects such as storage objects 116 and 118 may be associated with one another. For example, storage object 118 may be a duplicate of storage object 116. In illustrated data storage network 100, inactive/latent data such as that stored within storage object 118 may or may not be indexed utilizing metadata 110. Consequently, storage management processing module 108 may be the only element within data storage network 100 capable of tracking the location of such inactive data. When storage object 116 (and consequently storage object 118) includes data to be destroyed or "shredded" storage management processing module 108 identifies the associated inactive storage objects utilizing metadata 110 and subsequently renders data associated with the appropriate storage objects permanently unreadable. Several shortcomings are therefore associated with such a data shredding process.

As storage management processing module 108 is responsible for storage element management including the processing of storage element creation, deletion and/or access (e.g., read/write) requests in addition to the permanent destruction of data via shredding, this module may become overloaded and a system bottleneck. Consequently, expired data may be retained for longer than necessary or desired and/or storage read and write operations may be unnecessarily delayed. Moreover, the described shredding technique necessitates the tracking of storage objects (utilizing metadata 110) to be shredded which may be otherwise ignored.

SUMMARY

A method and system are provided for shredding data within a data storage subsystem. According to one embodiment of the present invention a method is provided of continually shredding data within a data storage subsystem in which all the data of a first storage element is made permanently unreadable followed by the performance of a data shred process. In the described data shred process, a second storage element is initially selected (e.g., from plurality of candidate or potential storage elements), which includes a first storage object to be preserved and a second storage object to be shredded. Once the second storage element has been selected, data of the first storage object is stored/copied within the first storage element. Thereafter, all data of the second storage element is rendered permanently unreadable.

The foregoing is a summary and thus contains, by necessity, simplifications, generalizations and omissions of detail; consequently, those skilled in the art will appreciate that the summary is illustrative only and is not intended to be in any way limiting. As will also be apparent to one of skill in the art, the operations disclosed herein may be implemented in a number of ways including implementation in hardware, i.e. ASICs and special purpose electronic circuits, and such changes and modifications may be made without departing from this invention and its broader aspects. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous features and advantages made apparent to those skilled in the art by referencing the accompanying drawings in which.

DETAILED DESCRIPTION OF AN ILLUSTRATIVE EMBODIMENT

The following sets forth a detailed description of at least the best contemplated mode for carrying out the one or more systems, devices and/or processes described herein. The description is intended to be illustrative and should not be taken to be limiting.

In the following detailed description, numerous specific details such as specific method orders, structures, elements, and connections have been set forth. It is to be understood however that these and other specific details need not be utilized to practice embodiments of the present invention. In other circumstances, well-known structures, elements, or connections have been omitted, or have not been described in particular detail in order to avoid unnecessarily obscuring this description.

References within the specification to "one embodiment," "an embodiment," or "embodiments" are intended to indicate that a particular feature, structure, or characteristic described in connection with the embodiment is included in at least one embodiment of the present invention. The appearance of such phrases in various places within the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Embodiments of the present invention provide a method and system for shredding data such as reference data within a data storage subsystem. Reference data may include any data utilized in conjunction with an enterprise (e.g., internal reporting structures, counterparty data, instrument data, product and market data, rating and industry classification schemes, or the like). In one or more embodiments of the present invention, an exhaustive shred operation is performed which shreds (i.e., destroys or otherwise renders data permanently unreadable) all data of a storage element such as a logical storage volume including active as well as inactive or "latent" data. Such latent or inactive data may include, for example, copies of data which have been relocated or duplicated at one or more locations within a storage element via data storage subsystem entities (e.g., files systems, volume or storage managers, data replicators, or the like). Embodiments of the present invention may also be implemented as a continually rotating data shred process which selects a storage element, shreds the selected storage element's data, and then uses the emptied storage element to store data to be preserved from the next storage element selected for shredding.

Figure 1:
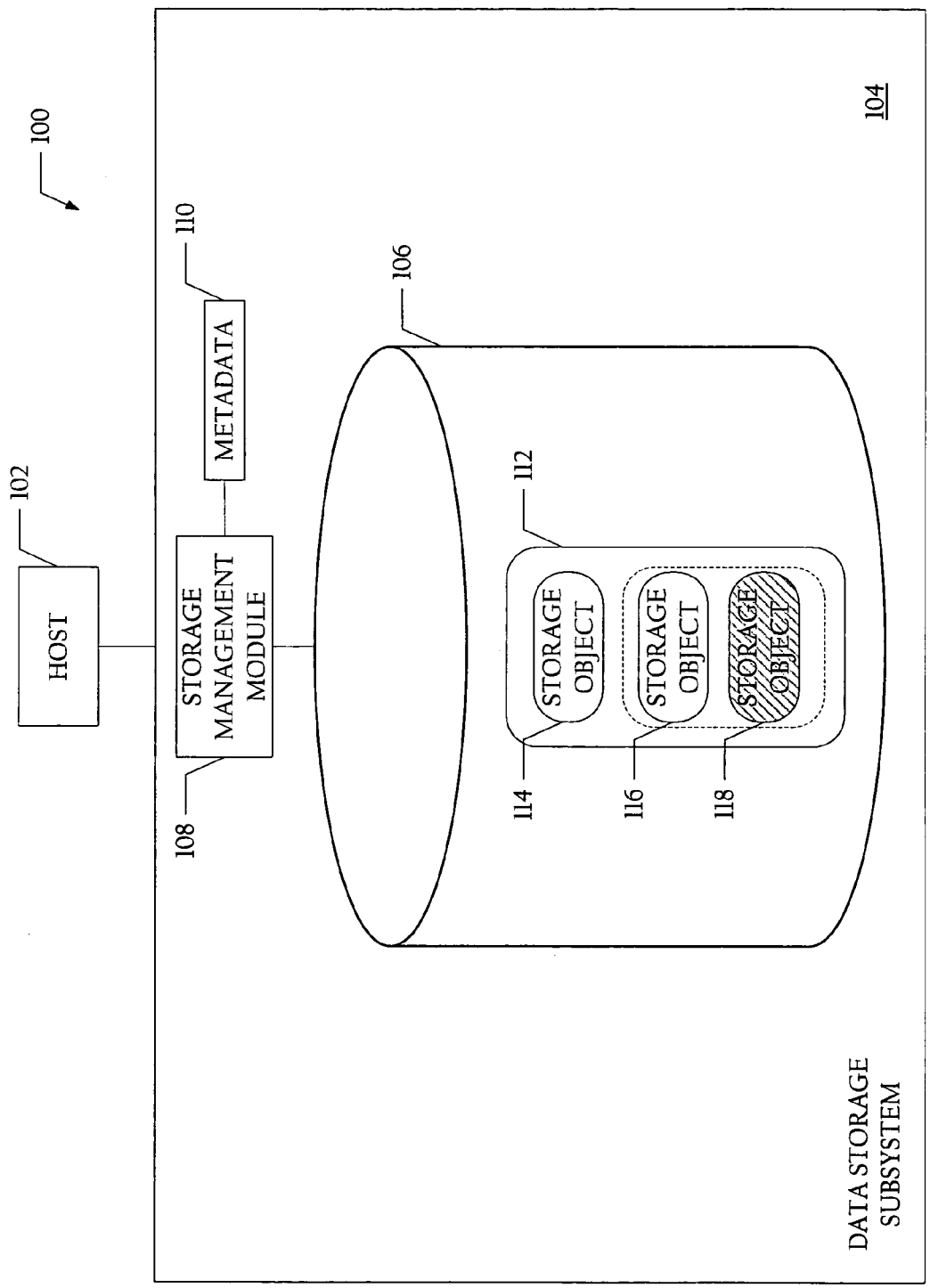
FIG. 1 illustrates a high level block diagram of a data storage network including a conventional data storage subsystem.
Figure 2:
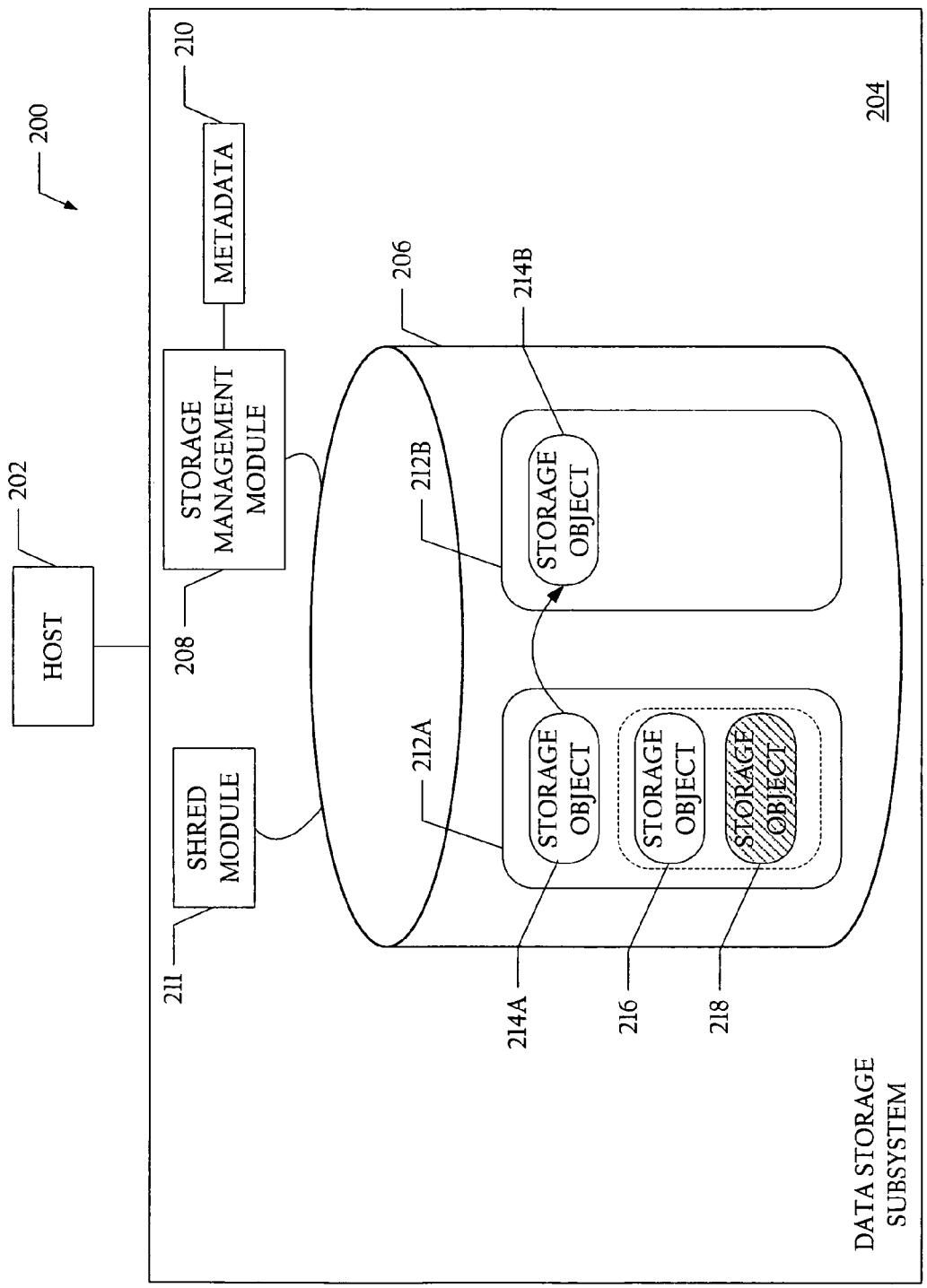
FIG. 2 illustrates a high level block diagram of a data storage network including a data storage subsystem according to an embodiment of the present invention.

Similarly, embodiments of the present invention may be implemented in a distributed environment, for example, where storage element management including the processing of storage element creation, deletion and/or access (e.g., read/write) requests is performed utilizing a first processing module (e.g., a processing device or software module) while a data shred process as described herein is performed utilizing a second, alternate processing module. As one exemplary system, FIG. 2 illustrates a high level block diagram of a data storage network including a data storage subsystem according to an embodiment of the present invention. In a data storage network 200 as depicted in FIG. 2, a host 202 is coupled to a data storage subsystem 204 via a communication channel or link.

Data storage subsystem 204 of the illustrated embodiment includes storage 206 (e.g., made up of one or more physical storage devices or media) coupled with separate processing modules used at least for storage management (e.g., storage management processing module 208) and for performing a data shred process (e.g., data shred processing module 211) as shown. In alternative embodiments of the present invention, such processes or actions may be performed utilizing a greater or lesser number of processing modules. For example, a single processing module may be utilized to accomplish both storage management and shredding operations according to one embodiment. Processing modules as illustrated in FIG. 2 and described herein may be implemented utilizing separate processors or processing cores of a high-availability processor subsystem or alternatively utilizing a single processor core within a uni or multi-processor system. Storage 206 of data storage subsystem 204 includes a plurality of storage elements (e.g., storage elements 212A and 212B) each capable of storing data within one or more storage objects (e.g., storage objects 214A, 214B, 216 and 218).

A storage element may include any logical or physical entity used to store data. In one embodiment of the present invention, each storage element represents a logical storage volume (e.g., a logical storage container, unit, or entity as defined by an operating system, file system, storage management hardware or software, storage device or appliance). For example, a storage element may include a Tivoli Storage Manager (TSM) volume or storage pool as defined by the Tivoli Storage Manager application provided by International Business Machines Corporation of Armonk, N.Y. and further described herein with respect to FIGS. 5A-5D. A storage element (e.g., a TSM volume) may also be hierarchically stored within one or more other logical and/or physical storage elements. Similarly, a storage object may include any logical data storage container, unit, or entity to which access may be controlled and/or usage of which may be restricted to a specific subject or group or class of subjects. According to various embodiments of the present invention, a storage object may include a file, a data structure, a storage page, word, byte, block, or the like.

In data storage network 200 of FIG. 2, data is stored within storage elements (e.g., storage element 212A) utilizing a storage management processing module 208. In the illustrated embodiment, the manner in which data is stored is monitored utilizing metadata 210 maintained or used by storage management processing module 208. Storage element 212A of data storage subsystem 204 includes two active data objects (storage objects 214A and 216) and one inactive or "latent" storage object (storage object 218). Active and inactive storage objects such as storage objects 216 and 218 may be associated with one another. For example, storage object 218 may be a duplicate of storage object 216 (e.g., may include data which duplicates data of storage object 216) created for parallel access, incremental change tracking, or retained following movement of storage object 216 due to a space reclamation or other system process. Storage object 218 may also include other data associated with storage object 216 (e.g., metadata regarding storage object 216) while not duplicating any portion of storage object 216 explicitly.

Inactive data such as that stored within storage object 218 may or may not be indexed (e.g., utilizing metadata 210) depending on system parameters or configuration. Consequently, such inactive data may or may not be tracked or "visible" to storage management processing module 208 or other systems elements (e.g., host 202 or data shred processing module 211). In the illustrated data storage network, storage object 214A includes data to be preserved while storage object 216 (and consequently storage object 218)

includes data to be destroyed or "shredded" (e.g., made permanently unreadable by any of the elements of data storage network 200). Data may be shredded at a raw storage (e.g., block) or file system level utilizing any of a number of techniques. For example, a storage object and its associated data may be shredded by overwriting all data of the storage object one or more times utilizing a predetermined file or data pattern (e.g., all logical ones, zeroes, some combination thereof). Techniques used for data or storage object shredding may be user or host-selectable (e.g., based upon a desired level of security) or automatically determined.

According to an embodiment of the present invention used in conjunction with data storage network 200, data shred processing module 211 causes data of storage object 214A to be stored (e.g. via copying, transfer, or other techniques) within storage element 212B (e.g., within storage object 214B) and subsequently shreds (i.e., renders permanently unreadable) all data of storage element 212A. Consequently, both active (e.g., storage object 216) and inactive (e.g., storage object 218) data to be shredded are destroyed without requiring the use of storage management processing module 208, metadata 210, or an interface between such elements or host 202 and data shred processing module 211. In various embodiments of the present invention, data shred processing module 211 may perform operations autonomously or may request or cause storage management processing module 208 or other system elements to perform operations on its behalf (e.g., opportunistically).

According to one embodiment of the present invention, modifications of data within storage element 212A are suspended while data of storage object 214A is stored within storage object 214B of storage element 212B to ensure that no updates (e.g., write operations, or other data or metadata changes) are lost and to maintain data consistency. For example, all or a relevant portion of storage element 212A may be designated read-only by modifying associated access permission metadata (e.g., flag, bit, indicator, or the like). In such an embodiment, any desired updates may then be resubmitted via a host or application once permission to modify a storage element storing the corresponding data is established. Alternatively, updates may be temporarily stored or queued (e.g., by data shred processing module 211 or storage management processing module 208) or applied to a proxy storage element and later applied or coalesced to an appropriate storage element, object, or data thereof. In still other embodiments, write activity may be simply redirected to other storage elements (e.g., storage element 212B) prior to the initiation of a data shred process. Once data of storage object 214A has been stored within storage element 212B, all data of storage element 212A may be rendered permanently unreadable.

Figure 3:
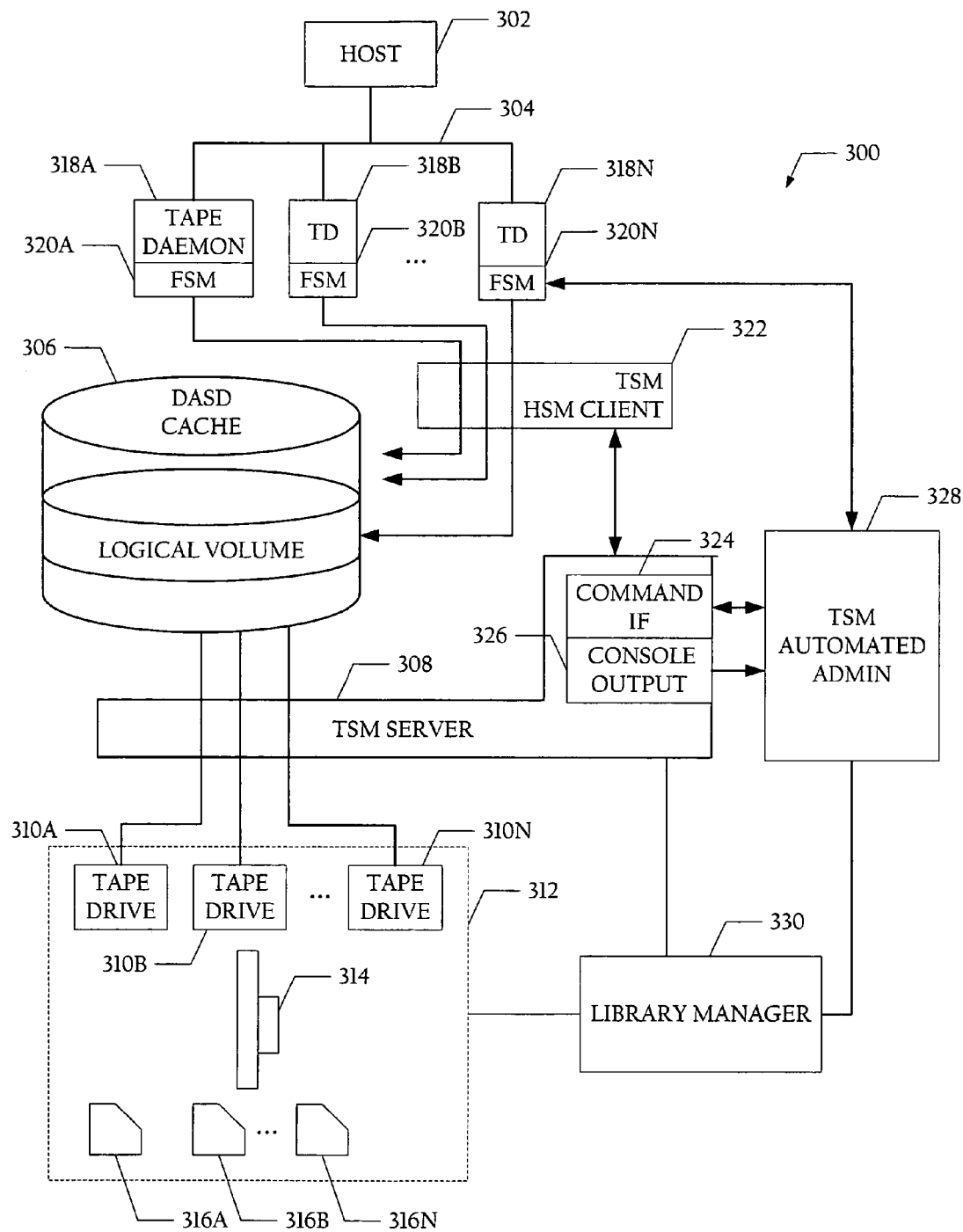
FIG. 3 illustrates a more detailed block diagram of a data storage network including a data storage subsystem according to an embodiment of the present invention.

FIG. 3 illustrates a more detailed block diagram of a data storage network 300 including a data storage subsystem according to an embodiment of the present invention. In the illustrated data storage network, a host 302 is shown communicatively coupled to a data storage subsystem via a host-to-data interface 304. Host-to-data interface 304, such as IBM's Enterprise Systems Connection (ESCON), may be a fiber optic local area network used to link mainframes to disk drives, other mainframes, or other storage devices. Data storage network 300 of the embodiment of FIG. 3 is implemented utilizing a virtual tape system or server (VTS). A virtual tape system is a special storage device or group of devices and software which manages data such that the data appears to be stored entirely on tape cartridges when some portions may actually be located in faster (e.g., hard disk) storage.

Programming for a virtual tape system is sometimes referred to as a virtual tape server although these terms may be used interchangeably unless otherwise specifically indicated. A virtual tape system may be used with a hierarchical storage management (HSM) system in which data is moved as it falls through various usage thresholds to slower but less costly forms of storage media. A virtual tape system may also be used as part of a storage area network (SAN) where less-frequently used or archived data can be managed by a single virtual tape server for a number of networked computers.

In the embodiment of FIG. 3, a virtual tape system includes a DASD (e.g., hard disk drive) cache 306 including one or more logical volumes; a storage management processing module (composed, in the illustrated embodiment, of a storage management server 308 and a hierarchical storage management (HSM) client 322); and a plurality of tape storage devices 310A, 310B, . . . 310N coupled with an automated library 312. Tape storage drives 310 are serviced by an accessor (e.g., a robot) 314 which transfers selected tape cartridges 316A, 316B, . . . 316N between tape storage drives 310 and their corresponding positions within a tape cartridge repository. Within automated library 312, accessor 314 may be controlled utilizing a library manager 330 based upon inputs received from storage management server 308 and/or automated storage management administrator 328. From the perspective of host 302, tape daemons 318A, 318B, . . . 318N may appear as multiple tape storage drives attached to host-to-data interface, or ESCON, 304.

Host-to-DASD cache data transfer in the illustrated virtual tape data storage subsystem may be controlled by VTS code via hierarchical storage manager (HSM) client 322. For example, in one embodiment host-to-DASD cache data transfer is directly controlled by a file system manager (FSM) 320A, 320B, . . . 320N which handles DASD read and write commands. Similarly, a DASD cache 306-to-tape storage drive 310 interface may be controlled by storage management server 308. One example of a storage management processing module which could be used as storage management server 308 and HSM client 322 is the Tivoli Storage Manager (TSM) application provided by International Business Machines Corporation of Armonk, N.Y. In data storage network 300, storage management server 308 includes a command interface 324 and a console output 326.

According to one embodiment, automated storage management administrator 328 provides functionality needed to achieve the data shred process of the present invention, and additionally performs many VTS specific administrative functions utilizing storage management server 308. For example, automated storage management administrator 328 may include a data shred processing module as previously described herein.

Figure 4:
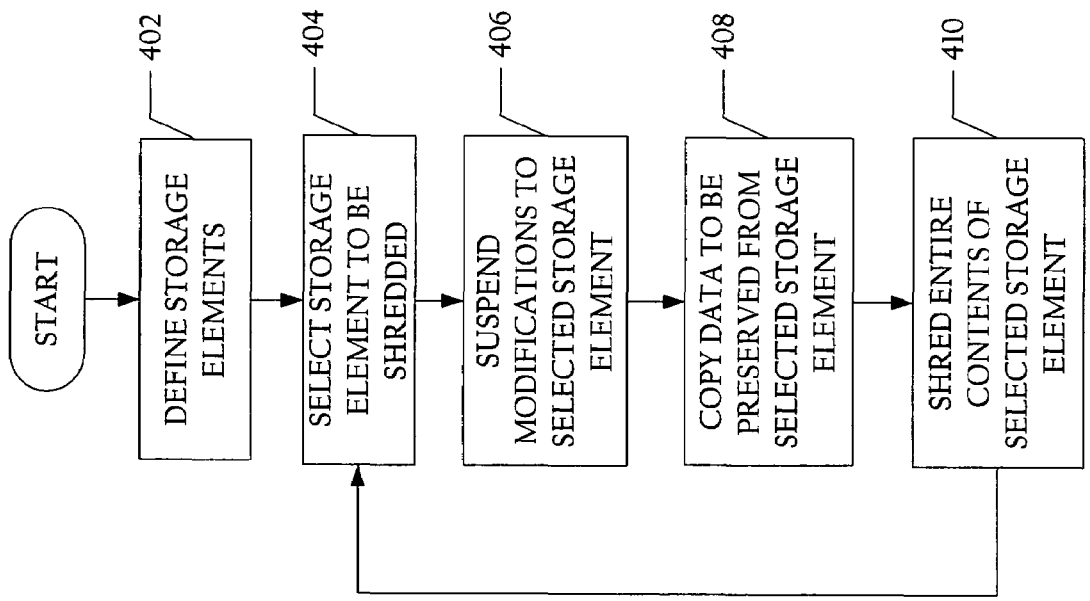
FIG. 4 illustrates a flow diagram of a data shred process according to an embodiment of the present invention.

FIG. 4 illustrates a flow diagram of a data shred process according to an embodiment of the present invention. Although the flow diagram depicted in FIG. 4 indicates a particular order of operation and a specific granularity of process operations, in alternative embodiments the illustrated order may be varied (e.g., process operations may be performed in another order or performed substantially in parallel) and one or more of the process operations may be coalesced or fragmented. Similarly, additional process operations may be added where necessary in alternative embodiments of the present invention.

In the illustrated process embodiment, a plurality of storage elements (e.g., logical volumes) are initially defined (process block 402). A storage element may be defined by creating or updating metadata indicating or specifying the attributes of the storage element (e.g., a reference or address map indicating, if necessary, the relationship between a "logical" storage element and a corresponding physical storage element or device). Such definition may be performed utilizing an operating or file system element or additional (e.g., storage management) software elements. In alternative embodiments of the present invention, storage elements may be hierarchically defined. For example, a TSM-defined logical volume may be defined for or "mounted" on a storage device, file, or operating system-defined logical volume as is depicted and described with respect to FIGS. 5A-5D.

Once the storage elements have been defined, a storage element including data to be shredded is selected (process block 404). Storage element selection may be based upon any of a number of parameters in alternative embodiments of the present invention. For example, a storage element having the least amount of data to be preserved (e.g., total number of bytes or blocks) or the most data to be shredded may be selected. According to one embodiment of the present invention, a predetermined threshold quantity of data to be shredded is defined and the first storage element to accumulate that volume of shreddable data causes the illustrated data shred process to be initiated autonomically and that storage element to be selected.

After a storage element has been selected for shredding, modifications to that storage element are suspended (e.g., by designating that storage element or a portion thereof read-only) (process block 406). Data to be preserved of the selected storage element is then stored or copied from the selected storage element (process block 408) to another storage element within an associated data storage subsystem (e.g., an empty or previously-shredded storage element). Following the transfer or copying of data from the storage element to be shredded, the entire contents of the selected storage element is shredded (process block 410). Following the shredding of the selected storage element, the illustrated process embodiment may be continued by selecting another storage element for destruction as shown.

FIGS. 5A-5D illustrate a high level block diagram of a storage address space over time as a data shred process according an embodiment of the present invention is applied. Address space 500 depicted in FIGS. 5A-5D includes a number, "N", of storage elements (e.g., logical volumes 502A, 502B, 502C, . . . 502N). Throughout the present description, the variable "N" has been used to designate a positive integer number of elements. It should be appreciated that although the same variable has been used in all instances, a uniform number of each of the associated elements is not required. For example, although FIG. 3 depicts "N" file system managers, tape storage devices, and tape cartridges, each group may include any number of elements. Similarly, any number of logical volumes as illustrated in FIGS. 5A-5D may be utilized with various embodiments of the present invention.

Figure 5A:
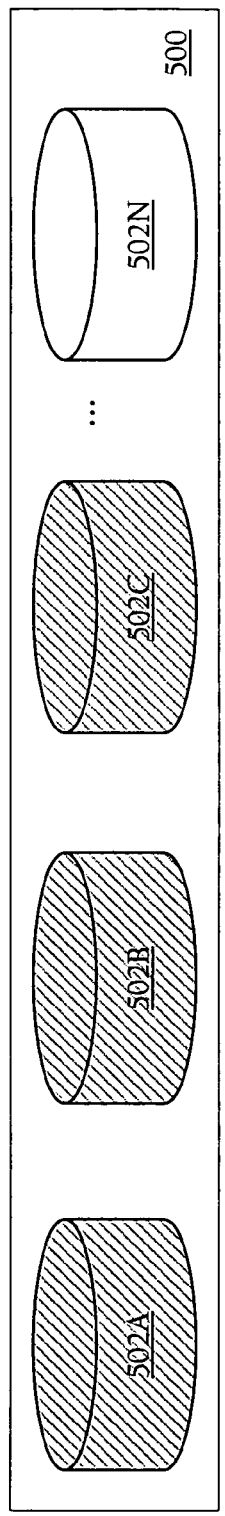
FIGS. 5A-5D illustrate a high level block diagram of a storage address space over time as a data shred process according an embodiment of the present invention is applied.
Figure 5B:
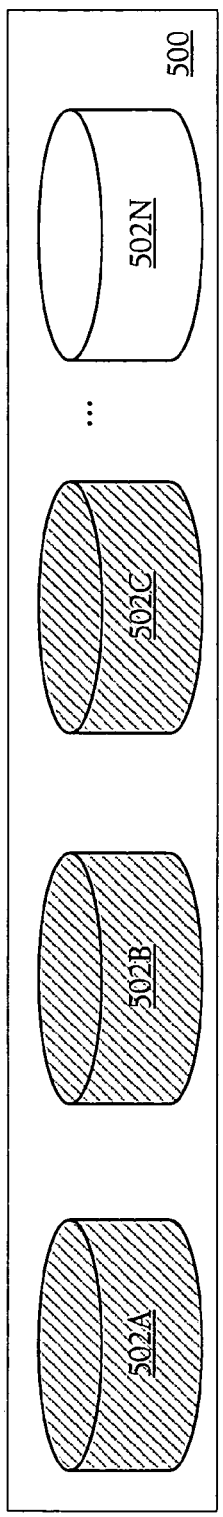
Figure 5C:
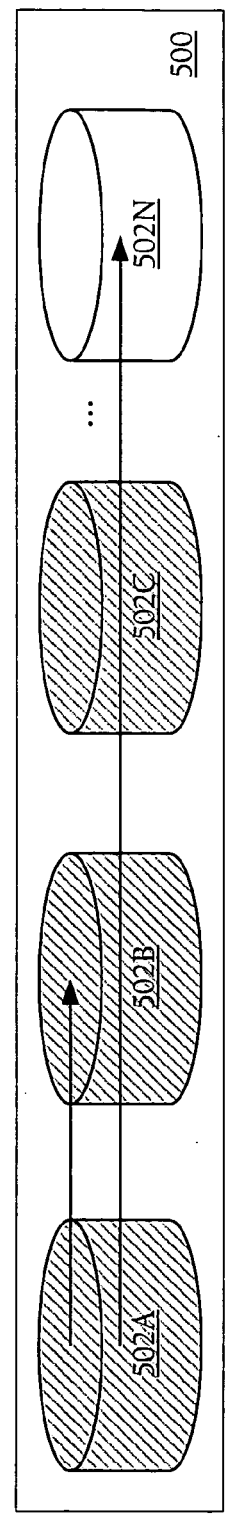
Figure 5D:
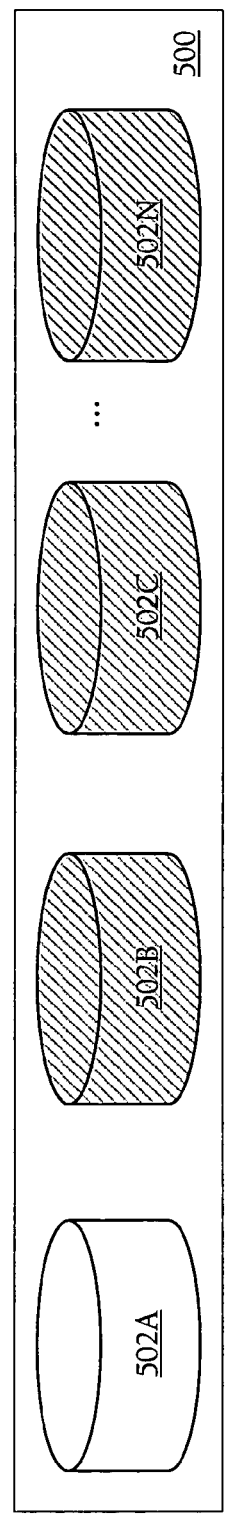

At a first time, T0, illustrated by FIG. 5A, logical volumes 502 are defined including an "empty" or "blank logical volume, 502N. The remainder of logical volumes 502 (e.g., logical volumes 502A, 502B, 502C . . . ) of the illustrated embodiment may then each be associated or "mounted" with a higher level storage element (e.g., a TSM volume) and subsequently written to within one or more storage objects (e.g., files). At some subsequent time, T1, illustrated by FIG. 5B, a logical volume (502A) is selected for shredding and designated read-only. Thereafter, at a time, T2, illustrated by FIG. 5C, another higher-level storage element (TSM volume) is associated with the previously-empty logical volume 502N and data (identified as data of logical volume 502A to be preserved) is copied or transferred to other logical volumes within address space 500 (e.g., logical volumes 502B and 502N).

Once all relevant data has been moved or copied from logical volume 502A, the higher-level (e.g., TSM) volume associated with or mounted on logical volume 502A may then be "deleted" or otherwise disassociated (e.g., by deleting, de-referencing, or modifying metadata indicating the relationship between the higher-level volume and logical volume 502A). It should be understood however that this "deletion" does not in fact "delete" or otherwise render unreadable any data of the previously existing TSM volume. Consequently, all remaining data of logical volume 502A is then made permanently unreadable at a time, T3, illustrated by FIG. 5D. Data may be "shredded" as described herein by mounting or otherwise gaining access to logical volume 502A in a "raw" (e.g., block-level) mode and overwriting all portions of the logical volume with a predetermined or selectable data shred pattern. After the described data shred process has been performed, logical volume 502A is rendered "empty" or "blank" and may then be configured to receive data to be preserved from other logical volumes 502 in a rotating or cyclical process.

Figure 6:
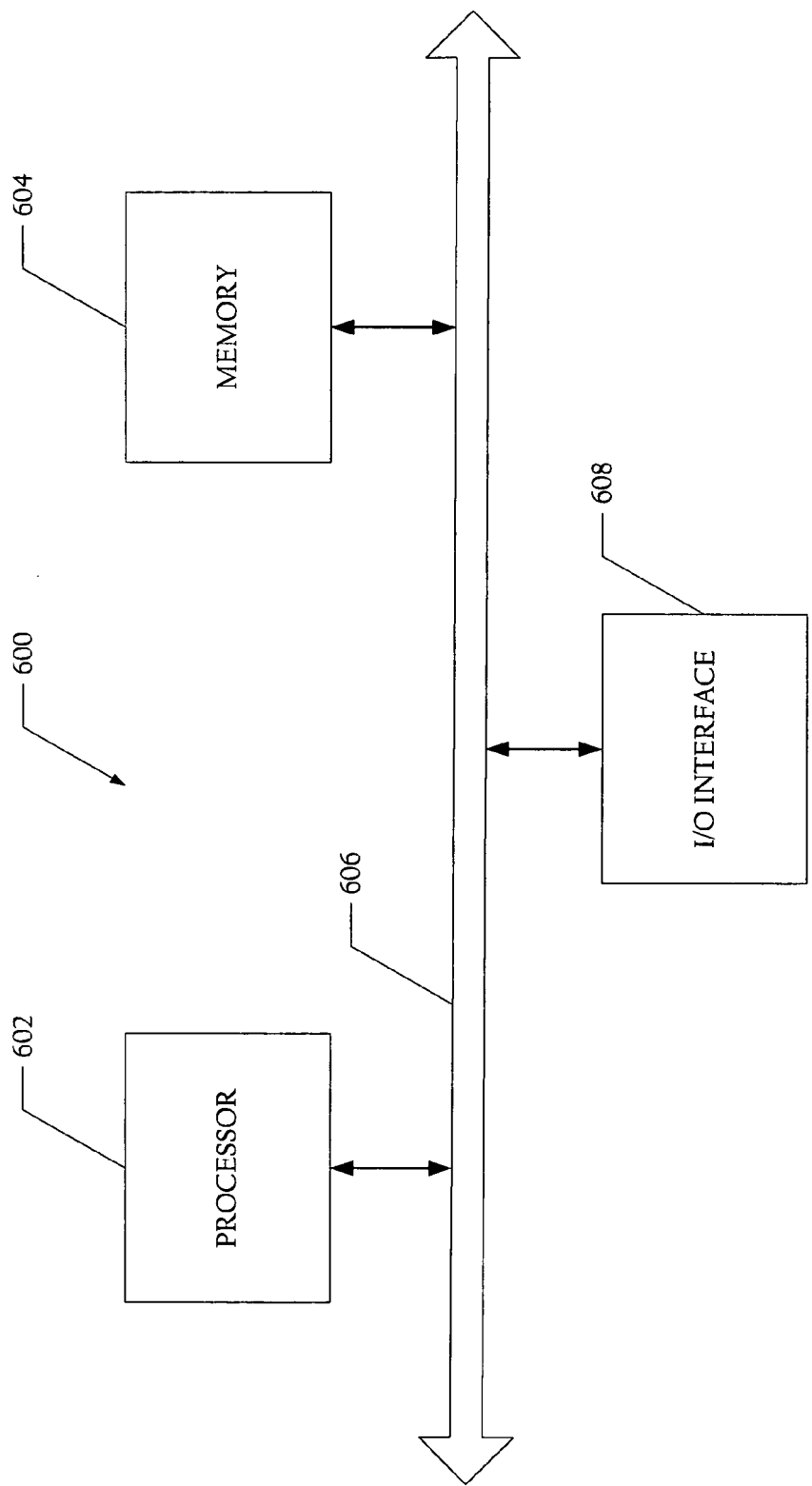
FIG. 6 illustrates a data processing system useable with one or more embodiments of the present invention.

FIG. 6 illustrates a data processing system useable with one or more embodiments of the present invention. While a particular number and arrangement of elements have been illustrated with respect to data processing system 600 of FIG. 6, it should be appreciated that embodiments of the present invention are not limited to data processing systems having any particular number, type, or arrangement of components and so many encompass a wide variety of data processing system types, architectures, and form factors (e.g., network elements or nodes, personal computers, workstations, servers, or the like). Data processing system 600 of the illustrated embodiment includes a processor 602 coupled to a memory 604 utilizing a bus 606. Memory 604 may comprise any of a number of system memory-type storage elements such as random access memory (RAM), read-only memory (ROM), flash memory, and cache.

Data processing system 600 of the illustrated embodiment further comprises an input/output (I/O) interface 608 coupled to bus 606 to communicatively couple one or more I/O devices (not shown) to data processing system 600. Exemplary I/O devices may include traditional I/O devices such as keyboards, displays, printers, cursor control devices (e.g., trackballs, mice, tablets, etc.), speakers, and microphones; storage devices such as fixed or "hard" magnetic media storage devices, optical storage devices (e.g., CD or DVD ROMs), solid state storage devices (e.g., USB, Secure Digital SD™, CompactFlash™, MMC, or the like), removable magnetic medium storage devices such as floppy disks and tape, or other storage devices or mediums; and wired or wireless communication devices or media (e.g., communication networks accessed via modem or direct network interface).

Embodiments of the present invention may include software, information processing hardware, and various processing operations further described herein. The features and process operations of the present invention may be embodied in executable instructions embodied within a machine-readable medium such as memory 604, a storage device, a communication device or medium, or the like. A machine-readable medium may include any mechanism that provides (i.e., stores and/or transmits) data in a form readable by a machine (e.g., data processing system 600). For example, a machine-readable medium includes but is not limited to: random access memory (RAM); read only memory (ROM); magnetic storage media; optical storage media; flash memory devices; electrical, optical, and/or acoustical propagated signals (e.g., carrier waves, infrared signals, digital signals, etc.); or the like. The described executable instructions can be used to cause a general or special purpose processor such as processor 602, programmed with the instructions, to perform operations, methods or processes of the present invention. Alternatively, the features or operations of the present invention may be performed by specific hardware components that contain hard-wired logic for performing the operations, or by any combination of programmed data processing components and custom hardware components.

The present invention has been described in the context of fully functional data processing system; however, those skilled in the art will appreciate that the present invention is capable of being distributed as a program product in a variety of forms and applies equally regardless of the particular type of signal bearing media used to carry out the distribution. Examples of such signal bearing media include recordable media such as floppy disks and CD-ROM, transmission type media such as digital and analog communications links, as well as media storage and distribution systems developed in the future. Embodiments of the present invention may similarly be implemented utilizing software modules used to perform certain operations or tasks. The described software modules may include script, batch, or other executable files and may be stored on a machine-readable or computer-readable medium. Thus, the modules may be stored within a computer system memory to configure a data processing or computer system to perform one or more functions of a software module. Other new and various types of machine or computer-readable storage media may be used to store the modules discussed herein.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention.

Consequently, the invention is intended to be limited only by the scope of the appended claims, giving full cognizance to equivalents in all respects.

What is claimed is:

1. A method for shredding data within a data storage subsystem having a plurality of storage elements, said method comprising:

in response to a selection of one of said storage elements having data to be shredded based on storage element utilization being at or below a predetermined threshold, suspending any data modifications to said selected storage element;

copying data that are required to be preserved from said selected storage element to another one or more of said storage elements within said data storage subsystem;

shredding entire contents within said selected storage element by overwriting all data with a data shred pattern; and thereafter, selecting a next one of said storage elements within said data storage subsystem as a candidate for shredding.

2. The method of claim 1, wherein said another one or more of said storage elements is either empty or has been previously shredded.

3. The method of claim 1, wherein said suspending further includes designating at least a portion of said selected storage element as read only.

4. The method of claim 1, wherein said suspending further includes inhibiting write operations to said selected storage element.

5. The method of claim 1, wherein said another one or more of said storage elements include a minimum amount of data to be preserve.

6. A computer-readable storage medium having a computer program product for shredding data within a data storage subsystem having a plurality of storage elements, said computer-readable medium comprising:

computer program code for, in response to a selection of one of said storage elements having data to be shredded based on storage element utilization being at or below a predetermined threshold, suspending any data modifications to said selected storage element;

computer program code for copying data that are required to be preserved from said selected storage element to another one or more of said storage elements within said data storage subsystem;

computer program code for shredding entire contents within said selected storage element by overwriting all data with a data shred pattern; and computer program code, thereafter, selecting a next one of said storage elements within said data storage subsystem as a candidate for shredding.

7. The computer-readable storage medium of claim 6, wherein said another one or more of said storage elements is either empty or has been previously shredded.

8. The computer-readable storage medium of claim 6, wherein said computer program code for suspending further includes computer program code for designating at least a portion of said selected storage element as read only.

9. The computer-readable storage medium of claim 6, wherein said computer program code for suspending further includes computer program code for inhibiting write operations to said selected storage element.

10. The computer-readable storage medium of claim 6, wherein said another one or more of said storage elements include a minimum amount of data to be preserve.

11. A data storage subsystem capable of shredding data in any one or more of a plurality of storage elements within said data storage subsystem, said data storage subsystem comprising:

a storage management module for, in response to a selection of one of said storage elements having data to be shredded based on storage element utilization being at or below a predetermined threshold, suspending any data modifications to said selected storage element;

a TSM server for copying data that are required to be preserved from said selected storage element to another one or more of said storage elements within said data storage subsystem;

a shred module for shredding entire contents within said selected storage element by overwriting all data with a data shred pattern; and said storage management module for selecting a next one of said storage elements within said data storage subsystem as a candidate for shredding.

12. The subsystem of claim 11, wherein said another one or more of said storage elements is either empty or has been previously shredded.

13. The subsystem of claim 11, wherein said suspending further includes designating at least a portion of said selected storage element as read only.

14. The subsystem of claim 11, wherein said computer program code for suspending further include computer program code for inhibiting write operations to said selected storage element.

* * * * *